Nov. 11, 1930.   A. BENEDETTO   1,781,429
WOODWORKING MACHINERY
Filed Oct. 30, 1929   3 Sheets-Sheet 1

Inventor
Antonio Benedetto
By B. Singer, Atty.

Nov. 11, 1930.  A. BENEDETTO  1,781,429
WOODWORKING MACHINERY
Filed Oct. 30, 1929    3 Sheets-Sheet 2

Inventor
Antonio Benedetto
By B. Singer, atty

Nov. 11, 1930.  A. BENEDETTO  1,781,429
WOODWORKING MACHINERY
Filed Oct. 30, 1929  3 Sheets-Sheet 3
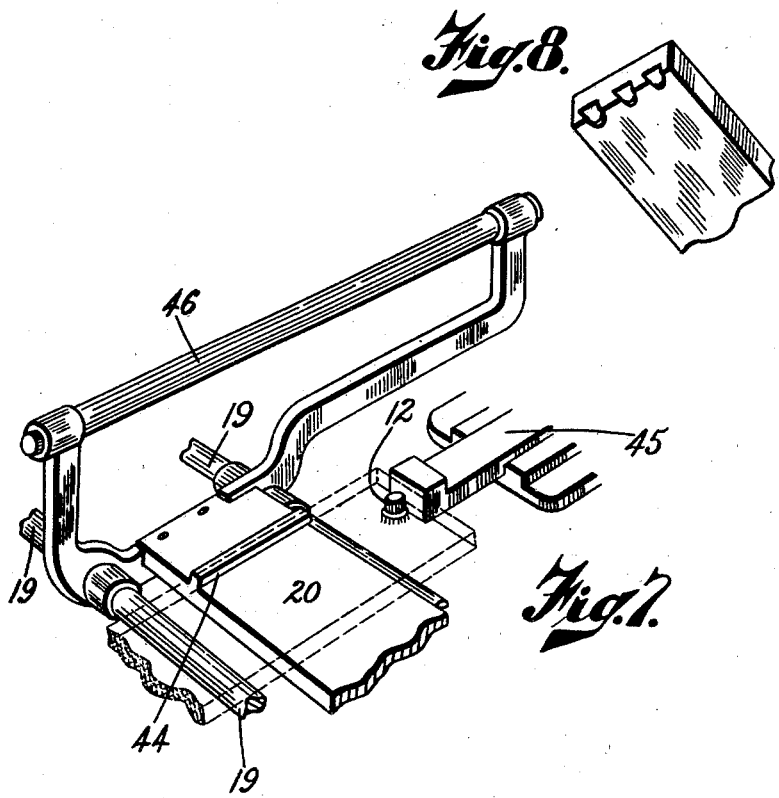
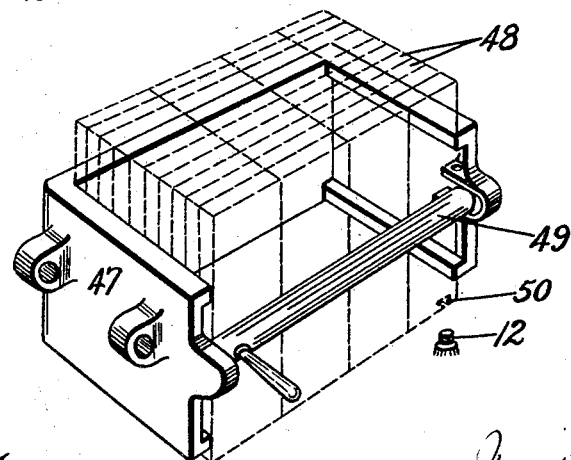

Patented Nov. 11, 1930

1,781,429

UNITED STATES PATENT OFFICE

ANTONIO BENEDETTO, OF ANNANDALE, NEAR SYDNEY, NEW SOUTH WALES, AUSTRALIA

WOODWORKING MACHINERY

Application filed October 30, 1929, Serial No. 403,540, and in Australia November 12, 1928.

This invention relates to improvements in wood working machinery and has particular reference to machines for cutting dove tails in wood.

An object of the invention is to devise a machine of the above nature which will cut slots for both portions of a dove tail joint.

A futher object of the invention is to devise means whereby when occasion demands one portion of the joint may be formed by a dove tail which does not extend completely through the piece of timber being used, such as for the front member of a drawer.

According to the invention the machine is provided with a rotatable cutter which may be tapered or of other preferred formation. The cutter is mounted upon a vertical spindle which rotates in bearings capable of being raised on the machine frame.

The work is mounted upon a saddle or table which is capable of reciprocating movement in relation to the rotatable cutter. The saddle or table is mounted upon rails. The saddle or table also has a guide, which may be adjustable, against which the work rests as it is fed to the rotating cutter, a stop being provided behind the cutter to determine the length of the slot made by the cutter when the work is being fed to it.

Intermittent step by step movement is given to the saddle or table by ratchet mechanism adapted to be operated by pressure upon a foot pedal or the like. By this means the dove tail cuts are formed at previously determined distances.

The saddle or table is also provided with a second saddle or box like chuck slidable on rails carried in brackets mounted on the first saddle. This box like chuck is provided for the purpose of forming the corresponding dove-tails to those just described; and is capable of presenting the work longitudinally face on to the cutter instead of end on.

For instance the sides of a drawer would be formed on the second saddle.

But in order that the invention may be more readily understood, reference will now be made to the accompanying drawings wherein:

Figure 7 is a perspective view showing the left hand end of the movable portion of the machine.

Figure 8 is a perspective view of portion of a board such as the front of a drawer showing the form of dove tail slots produced by the cutters when the board is laid flat and is pushed inwards against the cutter.

Figure 9 is a perspective view showing the means provided for holding several rows of boards such as the sides of a drawer, upon their ends in order that they may be advanced towards the cutter for the purpose of forming the dove tail cuts through their edges.

Figure 1:
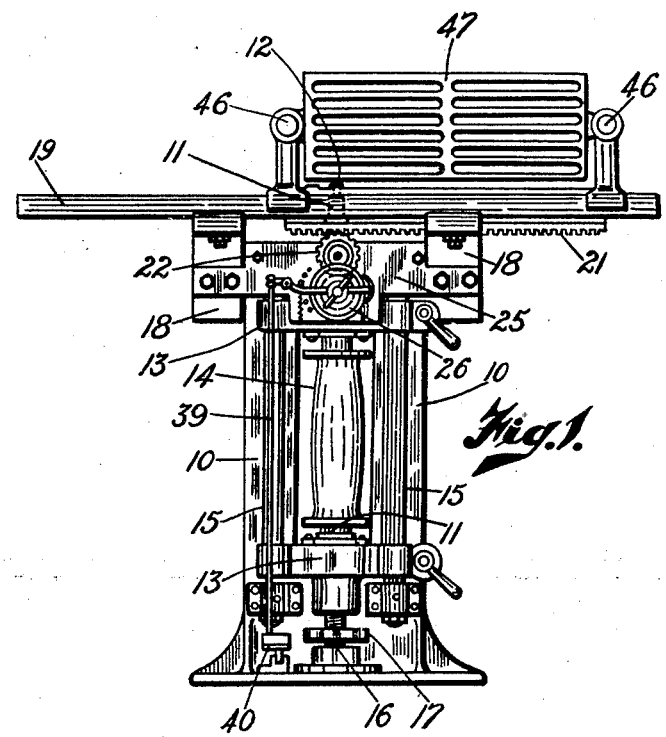
Figure 1 is a front elevation of the machine.
Figure 2:
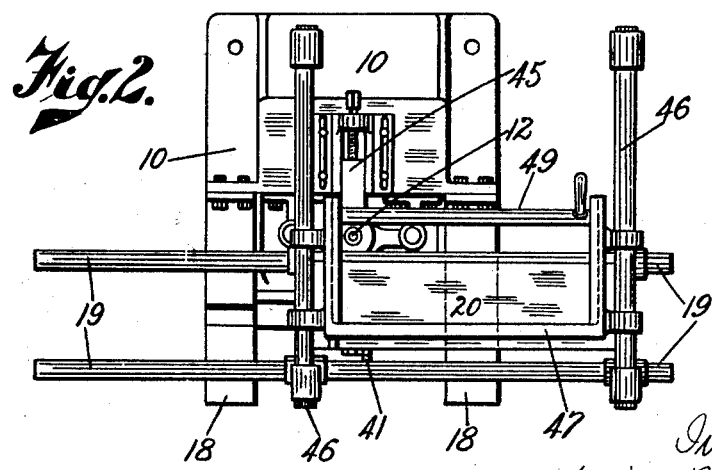
Figure 2 is a plan view thereof.
Figure 3:
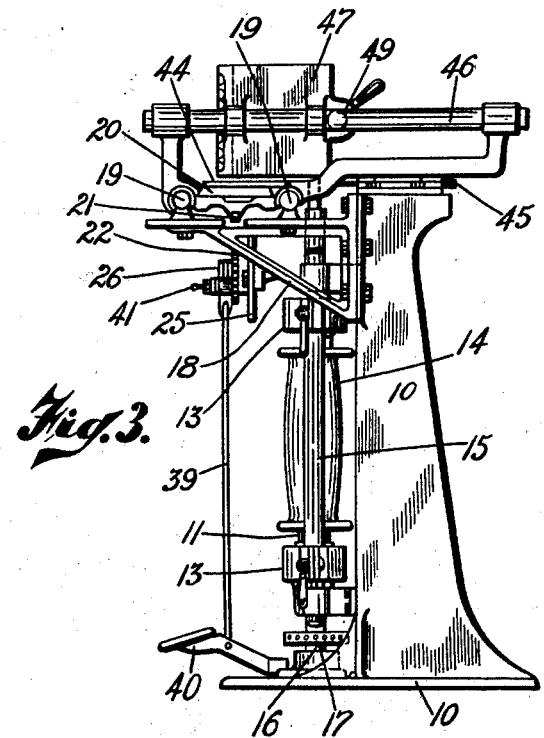
Figure 3 is a right hand elevation of the machine.

The machine has a frame 10 upon which a vertical spindle 11 carrying a cutter 12 is adjustably mounted in bearings 13. A driving pulley 14 is keyed to the spindle 11 between the bearings 13 which are adapted to be raised and lowered upon vertical slide bars 15, the raising and lowering being effected by a screw 16 and a collar 17 having holes to receive a pinch bar.

The frame 10 of the machine is also provided with brackets 18 which support rails 19 upon which a saddle or table 20, for supporting the work, is adapted to be moved longitudinally by means of a rack 21 and a pinion 22, which latter meshes with a second pinion 23 mounted upon a shaft 24 projecting from and journaled in a face plate 25 carried by the machine frame 10.

The shaft 24 carrying the pinion 23 for imparting movement to the rack 21, also has keyed thereto a right hand ratchet wheel 26 and a left hand ratchet wheel 27 which are separated by a disc 28 of slightly larger diameter, and are adapted to be alternately engaged by the respective pawl members 29 and 30.

The pawls 29 and 30 are preferably off set to each other and are part of a common central portion 31 by which they are pivotally mounted upon an arm 32, a spring such as 33 being provided to engage one or other of the pawl members 29 and 30 with their respective ratchet wheels 26 and 27 as desired.

Figures 4, 5:
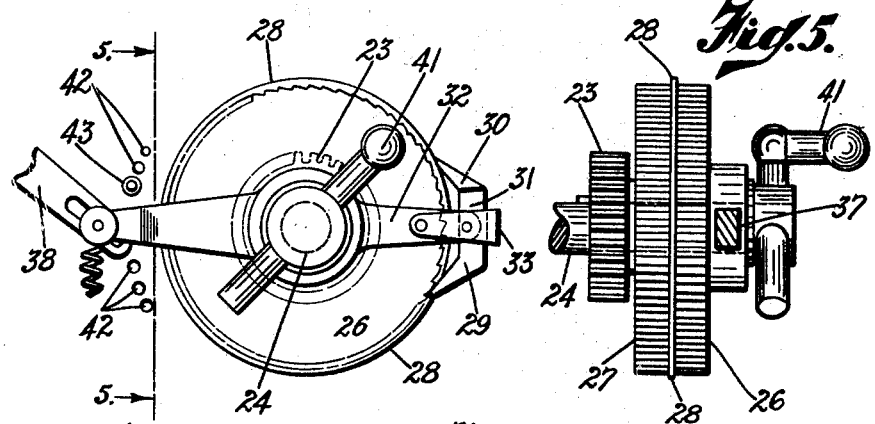
Figure 4 is a detail view on an enlarged scale showing portion of the feeding mechanism.
Figure 5 is a side view of the mechanism shown in Figure 4 looking in the direction of the arrows 5—5 of Figure 4.
Figure 6:
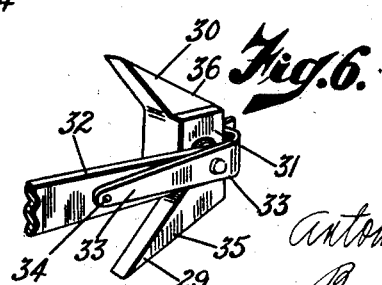
Figure 6 is a perspective view showing the combined forward and reverse pawl and its controlling spring.

The spring 33 is mounted upon the pivot 34 whereby it may be engaged alternatively with the rear faces 35 and 36 of the respective pawl members 29—30 to engage them with their particular ratchet wheels according to whether a left hand or right hand movement of the work is desired. In the position illustrated in Figures 4 and 6 the spring 33 is in its central position, and neither pawl member is in engagement with its respective ratchet wheel.

The arm 32 carrying the pawl members 29 and 30 is pivotally mounted upon the shaft 24 and has an extension 37 which is coupled to one end of a centrally pivoted lever 38. The other end of the centrally pivoted lever is coupled to a rod 39 capable of being actuated by a pedal 40. A handle 41 is mounted on the shaft 24 for the purpose of moving the saddle or table 20 along the rails 19 independently of the pawl and ratchet gear. The face plate 25 has holes 42 disposed therein to receive a pin 43 which is adapted to regulate the movement of the arm 37 and consequently the extent to which the pawl members 29—30 will engage the ratchet wheels. Normally the ratchet mechanism is adjusted so that on each depression of the pedal 40 the saddle 20 will move one sixteenth of an inch.

The work supporting table or saddle 20 has a guide 44 which may be adjustable and against which the work rests as it is fed to the rotating cutter 12. A stop 45 is also provided behind the cutter 12 to determine the extent of the slot or dove tail made by the cutter, when the work is being pushed against it.

A pair of runners 46 is disposed upon the saddle 20 at right angles to the runners 19 and have slidably mounted thereon a box like chuck 47 in which several rows of boards 48 may be clamped by a bar 49 when it is desired to form dovetail cuts through their edges.

When it is desired to cut the board in the manner shown in Figure 8 the board is held on the saddle 20 and against the guide 44 and is pushed towards the cutter 12 until the former engages the stop 45 at the rear of the machine frame. Other slots disposed parallel to that just described are formed in a similar manner after the saddle 20 has been moved the desired distance by the rack and pinion mechanism under actuation of the pedal 40.

Where the dove tails are to be formed by cuts extending through the boards 48 as shown at 50 in Figure 9 the boards 48 are first clamped in the box like chuck 47 and the latter is pressed forward upon its runners 46 to permit the first slot to be formed by the cutter 12, other slots being formed in a similar manner after the saddle 20 has been advanced by depressing the pedal 40.

I claim.

1. A dovetail cutting machine comprising a frame, a spindle mounted to rotate in bearings capable of vertical movement upon slide bars disposed on the said frame, a cutter carried by the spindle, a saddle or table adapted to slide longitudinally upon rails carried by the said frame, said saddle being provided with a rack engaged by a pinion which meshes with a second pinion mounted upon a shaft, said shaft being journaled in a face plate on the machine frame and having disposed thereon ratchet mechanism adapted to be operated by a pedal to advance the saddle upon its rails, and a box like chuck disposed above the saddle and capable of being moved transversely thereto.

2. A dovetail cutting machine comprising a frame, a spindle mounted to rotate in bearings capable of vertical movement upon slide bars disposed on the said frame, a cutter carried by the spindle, a saddle or table adapted to slide longitudinally upon rails carried by the said frame, said saddle being provided with a rack engaged by a pinion which meshes with a second pinion mounted upon a shaft, said shaft being journaled in a face plate on the machine frame and having disposed thereon right and left hand ratchet wheels mounted upon said shaft, pawl members therefor, said pawl members being formed upon a common central portion which is adapted to be moved upon a pivoted arm carrying a spring for the pawl members, a pedal for operating the ratchet wheels to advance the saddle upon its rails, and a box like chuck disposed above the saddle and capable of being moved transversely thereto.

3. A dovetail cutting machine comprising a frame, spindle mounted to rotate in bearings capable of vertical movement upon slide bars disposed on the said frame, a cutter carried by the spindle, a saddle or table adapted to slide longitudinally upon rails carried by the said frame, said saddle being provided with a rack engaged by a pinion which meshes with a second pinion mounted upon a shaft, said shaft being journaled in a face plate on the machine frame and having disposed thereon right and left hand ratchet wheels mounted upon said shaft, pawl members therefor, said pawl members being formed upon a common central portion which is adapted to be moved upon a pivoted arm carrying a spring for the pawl members, said pivoted arm being connected to a centrally pivoted lever having its opposite end coupled to a rod operated by a pedal, a handle mounted upon the shaft carrying the ratchet wheels and said second pinion whereby the pinions may be rotated independently of the pedal to move the said carriage, and a box like chuck disposed above the saddle and capable of being moved transversely thereto.

4. A dovetail cutting machine comprising a frame, a spindle mounted to rotate in bearings capable of vertical movement upon slide bars disposed on the said frame, a cutter carried by the spindle, a saddle or table adapted to slide longitudinally upon rails carried by the said frame, said saddle being provided with a rack engaged by a pinion which meshes with a second pinion mounted upon a shaft, said shaft being journaled in a face plate on the machine frame and having disposed thereon right and left hand ratchet wheels mounted upon said shaft, pawl members therefore, said pawl members being formed upon a common central portion which is adapted to be moved upon a pivoted arm carrying a spring for the pawl members, said pivoted arm being connected to a centrally pivoted lever having its opposite end coupled to a rod operated by a pedal, a handle mounted upon the shaft carrying the ratchet wheels and said second pinion whereby the pinions may be rotated independently of the pedal to move the said carriage, and a box like chuck adapted to slide upon runners disposed transversely upon the said saddle.

In testimony whereof I have hereunto set my hand.

ANTONIO BENEDETTO.